(12) United States Patent
Huang et al.

(10) Patent No.: US 11,017,043 B2
(45) Date of Patent: May 25, 2021

(54) SIMILARITY MINING METHOD AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yundu Huang, Beijing (CN); Haiyong Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 250 days.

(21) Appl. No.: 16/085,893

(22) PCT Filed: Jan. 5, 2017

(86) PCT No.: PCT/CN2017/070225
§ 371 (c)(1),
(2) Date: Sep. 17, 2018

(87) PCT Pub. No.: WO2017/157090
PCT Pub. Date: Sep. 21, 2017

(65) Prior Publication Data
US 2020/0301982 A1    Sep. 24, 2020

(30) Foreign Application Priority Data
Mar. 15, 2016  (CN) .......................... 201610146542.9

(51) Int. Cl.
*G06F 16/9535* (2019.01)
*G06F 16/2458* (2019.01)
(Continued)

(52) U.S. Cl.
CPC ...... *G06F 16/9535* (2019.01); *G06F 16/2465* (2019.01); *G06F 16/90328* (2019.01); *G06F 40/49* (2020.01); *G06N 3/04* (2013.01)

(58) Field of Classification Search
None
See application file for complete search history.

(56) References Cited

U.S. PATENT DOCUMENTS 7,606,810 B1 * 10/2009 Jeavons ................. G06Q 30/02
9,767,409 B1 *  9/2017 Makhijani ........... G06F 16/7867
(Continued)

FOREIGN PATENT DOCUMENTS

CN    101206674 A    6/2008
CN    104778161 A    7/2015
(Continued)

OTHER PUBLICATIONS

International Search Report with English translation and Written Opinion for Application No. PCT/CN2017/070225 dated Mar. 8, 2017 (9 pages).

*Primary Examiner* — Wilson Lee
(74) *Attorney, Agent, or Firm* — Michael Best & Friedrich LLP

(57) ABSTRACT

Disclosed is a similarity mining method, comprising: acquiring user behavior data and brand word data, wherein the user behavior data includes user search word data and user comment data; acquiring search brand words according to the user search word data and pre-stored brand word data; constructing a corpus important vocabulary library relating to the search brand words according to the user behavior data; using the corpus important vocabulary library as an input of a word vector tool to perform word vector model training to acquire word vectors of the search brand words; calculating a distance between the search brand words according to the word vectors of the search brand words. The (Continued)

invention further provides a similarity mining device, which calculates similarities of the brand words using a clustering algorithm (e.g., word2vector) according to the user search word data and the user post-purchase comment data.

6 Claims, 7 Drawing Sheets

(51) Int. Cl.
*G06F 16/9032* (2019.01)
*G06F 40/49* (2020.01)
*G06N 3/04* (2006.01)

(56) References Cited

U.S. PATENT DOCUMENTS

| | | | | |
|---|---|---|---|---|
| 2011/0047161 | A1* | 2/2011 | Myaeng | G06F 16/3338 707/740 |
| 2011/0087648 | A1* | 4/2011 | Wang | G06F 21/56 707/709 |
| 2013/0014136 | A1* | 1/2013 | Bhatia | H04N 21/4222 725/9 |
| 2014/0195544 | A1* | 7/2014 | Whitman | G06F 16/435 707/744 |
| 2015/0154285 | A1* | 6/2015 | Saarinen | G06F 16/334 707/749 |
| 2015/0242525 | A1* | 8/2015 | Perlegos | G06F 16/972 707/782 |
| 2016/0065534 | A1 | 3/2016 | Liu et al. | |
| 2016/0070984 | A1* | 3/2016 | Watts | G06F 16/29 382/201 |
| 2016/0173693 | A1* | 6/2016 | Spievak | H04M 3/42042 379/265.09 |
| 2017/0075998 | A1* | 3/2017 | Ruvini | G06F 16/9535 |
| 2017/0193037 | A1* | 7/2017 | Bhagwan | G06Q 30/0256 |

FOREIGN PATENT DOCUMENTS

| | | |
|---|---|---|
| CN | 105095430 A | 11/2015 |
| CN | 105279288 A | 1/2016 |

* cited by examiner

| Relevant word ranking | Relevant word brand | Relevance |
|---|---|---|
| 1 | Beijirong | 72.25% |
| 2 | TONLION | 72.21% |
| 3 | LEABORNES | 71.98% |
| 4 | Pierre Cardin | 71.97% |
| 5 | YISHION | 70.81% |
| 6 | Qianzhihe | 70.7% |
| 7 | SEPTWOLVES | 70.4% |
| 8 | Mark Fairwhale | 70.36% |
| 9 | YAYA | 69.99% |
| 10 | Bossini | 69.9% |

FIG. 5b

| Relevant word ranking | Relevant word brand | Relevance |
|---|---|---|
| 1 | Cow&Gate | 74.18% |
| 2 | Nutrilon | 72.91% |
| 3 | Karicare | 72.7% |
| 4 | Dumex | 70.27% |
| 5 | Enfamil | 70.1% |
| 6 | Abbott | 69.56% |
| 7 | Nutricia | 69.37% |
| 8 | Herobaby | 68.1% |
| 9 | Topfer | 67.89% |
| 10 | Friso | 67.2% |

FIG. 6b

SIMILARITY MINING METHOD AND DEVICE

TECHNICAL FIELD

The invention belongs to the field of information processing technology, and in particular relates to a similarity mining method and device.

BACKGROUND ART

In this era of rapid economic development, people's demands for materials have also greatly increased. Owing to comparatively stable styles, functions, effects, tastes and so on of products under brands, people will always use their own familiar brands. This causes a certain resistance when other brands are recommended to users in a recommendation system; and this also makes it difficult for a new brand company to promote products of the brand. Thus, an invention of an automated low-cost method for mining a brand similarity is of great significance to recommend in the recommendation system brands of similar styles, functions, effects, tastes and so on to the users to make it easier for the users to accept the recommended brands; and to construct a brand ecological structure of the market, and make the company develop strategic solutions in a more targeted manner.

The existing brand similarity mining method includes a method for manual evaluation of scores from all parties and a public opinion hot topic clustering method. Among them, as shown in FIG. 1, the method for manual evaluation of scores from all parties generally collects brand words manually; makes all parties, such as social persons, educators, politicians, ordinary people, and enterprise elites, score the similarity between the respective brands; and coordinates the scores of the people from all walks of life, uses formulae to calculate the brand similarities, and gives rankings. However, the method requires a large number of questionnaires, and the labor cost is high; as for a paper questionnaire survey or an online questionnaire survey, the respondents often have a perfunctory attitude, resulting in inaccurate results and comparatively subjective calculation results; and manual processing real-time is comparatively low, and there will be a delayed response.

As shown in FIG. 2, the public opinion hot topic clustering method generally crawls comment viewpoint data containing brand keywords on a social network, and uses a clustering method, such as a LDA topic clustering method, and then adds formulae to calculate the brand network heat. The method crawls user comment data on the brands on a search engine or on a social network such as micro-blog, which involves techniques of how to quickly and efficiently perform crawling and perform storing in a form that is easy to read; unstructured data for user comments is subjected to data cleaning to eliminate garbage data, useless data and interference data. After purification, another copy is stored in a structured form; the required structured data is read, and clustering is performed by the LDA topic clustering method to obtain a probability matrix of each brand word. Formulae are used to calculate the similarity between the brands. However, the calculation of the network heat according to the public opinion comparatively easily causes fluctuations due to hot topic events, which can only represent a certain network heat, and cannot represent a relatively stable brand similarity very well.

SUMMARY OF THE INVENTION

It is an object of the invention to provide a similarity mining method and device.

According to one aspect of the invention, a similarity mining method is provided, the method comprising: acquiring user behavior data and brand word data, wherein the user behavior data includes user search word data and user comment data; acquiring search brand words according to the user search word data and pre-stored brand word data; constructing a corpus important vocabulary library relating to the search brand words according to the user behavior data; using the corpus important vocabulary library as an input of a word vector tool to perform word vector model training to acquire word vectors of the search brand words; and calculating a similarity between the search brand words according to the word vectors of the search brand words.

Preferably, the similarity mining method further comprises: supplementing the user comment data under the search brand word when the similarities between the search brand word and other search brand words are all less than a preset threshold.

Preferably, in constructing a corpus important vocabulary library relating to the search brand words according to the user behavior data, the corpus important vocabulary library is constructed by subjecting the user behavior data to filtration, merging, segmentation, and word deactivation.

Preferably, in using the corpus important vocabulary library as an input of a word vector tool to perform word vector model training to acquire word vectors of the search brand words, word2vec is used as the word vector tool, and an HS-CBOW model is used to establish the word vectors of the corpus important vocabulary library.

Preferably, the similarity mining method further comprises: classifying the search brand words according to the similarity between the search brand words, and exhibiting a relevance map of brands of respective categories according to the classification result.

According to the other aspect of the invention, a similarity mining device is provided, the device comprising: a data acquiring module for acquiring user behavior data and brand word data, wherein the user behavior data includes user search word data and user comment data; a search brand word mining module for acquiring search brand words according to the user search word data and pre-stored brand word data; a vocabulary library constructing module for constructing a corpus important vocabulary library relating to the search brand words according to the user behavior data; a training module for using the corpus important vocabulary library as an input of a word vector tool to perform word vector model training to acquire word vectors of the search brand words; and a similarity calculating module for calculating a similarity between the search brand words according to the word vectors of the search brand words.

Preferably, the similarity mining device further comprises: a data supplementing module for acquiring the similarity between the search brand words according to a distance between the search brand words.

Preferably, the vocabulary library constructing module constructs the corpus important vocabulary library by subjecting the user behavior data to filtration, merging, segmentation, and word deactivation.

Preferably, the training module uses word2vec as the word vector tool, and uses an HS-CBOW model to establish the word vectors of the corpus important vocabulary library.

Preferably, the similarity mining device further comprises: an exhibiting module for classifying the search brand words according to the similarity between the search brand words, and exhibiting a relevance map of brands of respective categories according to the classification result.

The similarity mining method and device provided by the invention calculate similarities of the brand words using a clustering algorithm (e.g., word2vector) according to the user search word data and the user post-purchase comment data, which can automatically calculate a similarity between brands, reduce a personnel cost, increase a brand recall rate, and improve a recommended brand conversion rate.

BRIEF DESCRIPTION OF THE DRAWINGS

The above and other objects, characteristics and advantages of the invention will be clearer by means of the descriptions of embodiments of the invention with reference to figures below, and in the figures.

DETAILED DESCRIPTION

Various embodiments of the invention will be described in a more detail manner below with reference to the figures. In the various figures, the same element is denoted by identical or similar reference signs. For the sake of clarity, the various parts in the figures are not drawn to scale.

Figure 3:
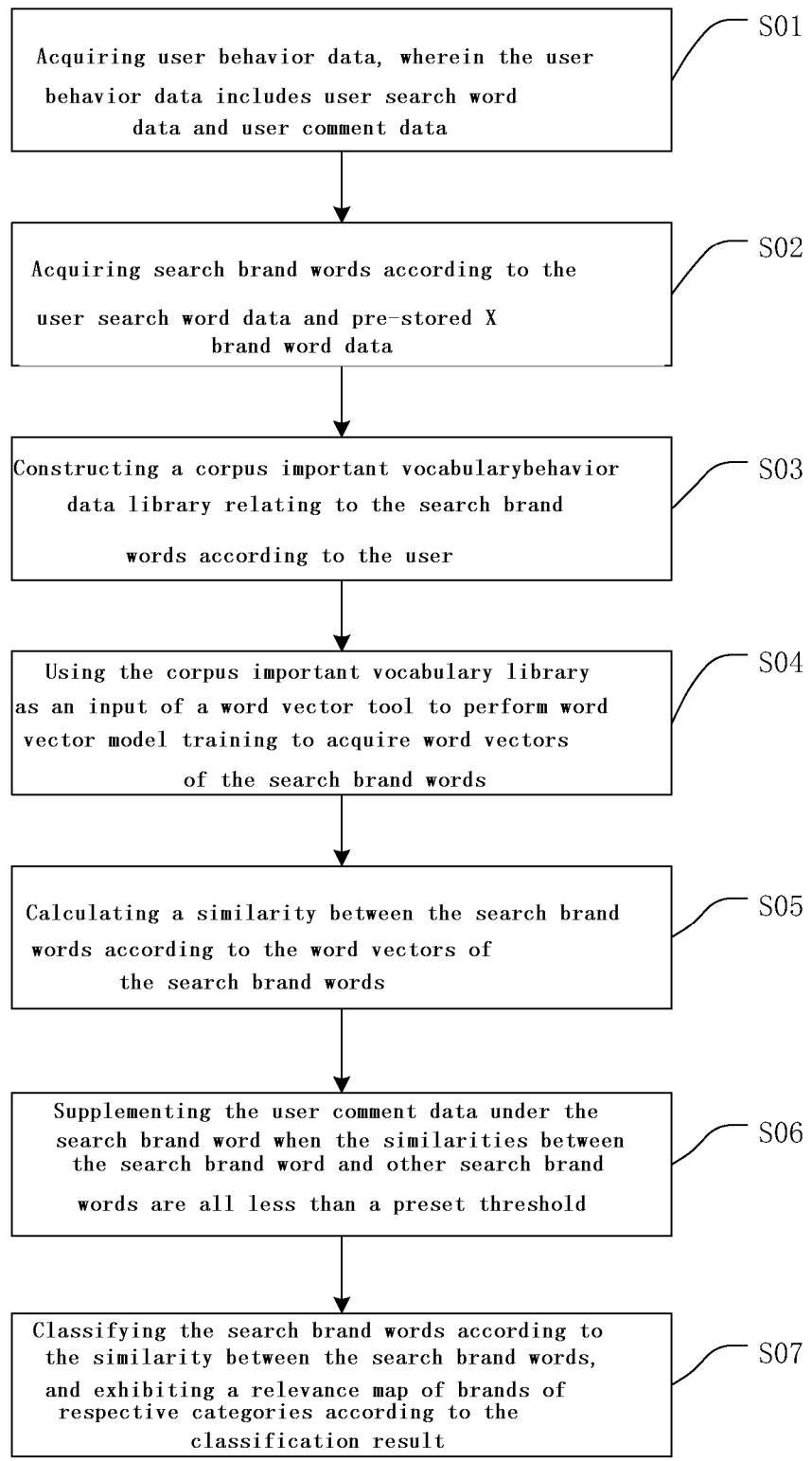
FIG. 3 shows a flow chart of a similarity mining method according to an embodiment of the invention.

The invention may be embodied in various forms, and some examples will be described below:

FIG. 3 shows a flow chart of a similarity mining method according to an embodiment of the invention. As shown in FIG. 3, the similarity mining method comprises the following steps:

In step S01, user behavior data and brand word data are acquired, wherein the user behavior data includes user search word data and user comment data.

In the embodiment, user post-shopping comment text data, user search word data, and brand word data are acquired from a data warehouse through a hive query statement. After observing a large amount of data and understanding the data, filtering rules are formulated to filter out invalid garbage data. The user post-shopping comment text data is subjected to segmentation and part-of-speech tagging, and a proprietary word bank is established to enhance the effect of the segmentation and part-of-speech tagging.

In step S02, search brand words are acquired according to the user search word data and the brand word data.

In the embodiment, the user search word data is filtered to filter out search words not related to the brand to obtain search words related to the brand. The brand words are extracted from the search words related to the brand according to the brand word data to obtain the search brand words.

Specifically, the user behavior data is filtered to obtain user search word data, wherein the user search word data includes brand words, by taking one piece of the user search word data as an example, the user search word data is: BOSIDENG, down jacket, light and thin, and the brand word, i.e., the search brand word, is acquired from the user search word data according to the brand word data. We can get the search brand word as follows: BOSIDENG.

In step S03, a corpus important vocabulary library relating to the search brand words is constructed according to the user behavior data.

In the embodiment, the corpus important vocabulary library is constructed by subjecting the user behavior data to filtration, merging, segmentation, and word deactivation.

In step S04, the corpus important vocabulary library is used as an input of a word vector tool to perform word vector model training to acquire word vectors of the search brand words.

In the embodiment, in the word vector model training, the achievement is made by means of a word2vec tool. The trained corpus important vocabulary library includes the user comment data of the search brand words, and each piece of data includes the search brand words and characters describing the search brand words. In order to reduce an impact of data on training word vectors, the data is firstly subjected to filtering and merging operations, and valid data is obtained after a data cleaning treatment. In addition, by considering a training speed and a complexity of achieving recommendation, a HS-CBOW model that is trained comparatively fast and is relatively easily achieved in terms of engineering is selected to be used to establish the word vectors of the corpus important vocabulary library.

Further, in terms of the selection of a word vector dimension, generally speaking, the higher the dimension is and the larger the text window is, the better the feature representation effect of the word vectors is, but the longer the time consumption of the word vector training is, and the larger the space occupied by training results is. When a comparatively large data set is faced, a comparatively fast calculation efficiency can be maintained by setting the dimension to a 100-dimensional one, and selecting the text window as 5, and word vectors of a certain amount of vocabulary are finally obtained by training.

word2vec is a neural network toolkit released by Google. The main models used are CBOW (Contiuous Bag-of-Words) and Skip-Gram. The text vocabulary in the input can be transformed into a series of word vectors, and this tool set has been applied in many applications of natural language processing. A typical implementation of the word2vec algorithm is to construct a vocabulary library with training text data, and then obtain a vector representation of the vocabulary by learning.

In S05, a similarity between the search brand words is calculated according to the word vectors of the search brand words.

In the embodiment, a distance between brands a and b is calculated by a quantity product of the word vectors, and then the similarity between a and b is calculated according to the formula $sim(a,b) = cosine(word2vec(a), word2vec(b))$. The larger the distance between a and b is, the higher the similarity between a and b is.

In a preferred implementation mode, the similarity mining method further comprises step S06.

In step S06, the user comment data under the search brand word is supplemented when the similarities between the search brand word and other search brand words are all less than a preset threshold.

Due to the complexity and large volume of user comments, we cannot use all the comment data to perform training at one time, and not all the comments contribute to the calculation of the word vectors by the search brand words we need. Insufficiency of contributing data is likely to result in one of our search brand words not finding its relevant brand. Here, we judge whether the search brand word finds the relevant brand according to the calculated similarity, i.e., when the similarities between one of the search brand words and other search brand words are all less than the preset threshold, it indicates that the search brand word does not find the relevant brand, the user comment data under the search brand word is extracted according to the search brand word not finding the similarity, and the word vector of the search brand word is calculated again from step S01. The process is iterated multiple times until the number of iterations is greater than the set number of thresholds, thereby greatly increasing the recall rate of the brand similarity distance. As shown in Table 1 below, the similarities of several brands are exemplified, and the measurement of the brand similarities is felt more intuitively:

TABLE 1

Brand Similarity

| Brand 1 | Brand 2 | Similarity |
|---|---|---|
| GXG | Jack Jones | 80% |
| Hengyuanxiang | Antarctic | 85% |
| Hengyuanxiang | Jack Jones | 75% |
| Hengyuanxiang | McDonald's | 30% |

In a preferred implementation mode, the similarity mining method further comprises step S07.

In step S07, the search brand words are classified according to the similarity between the search brand words, and a relevance map of brands of respective categories is exhibited according to the classification result.

Figure 5A:
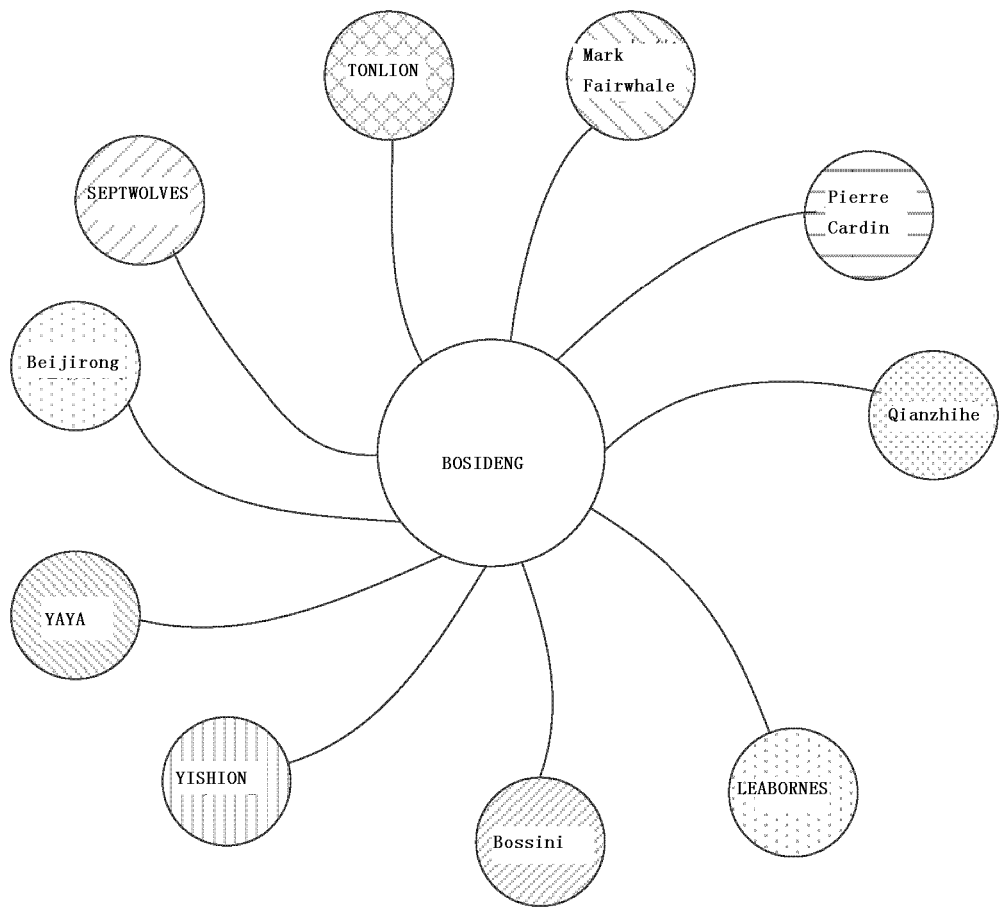
FIG. 5 shows a relevance map of brands of different categories according to an embodiment of the invention.

In the embodiment, the search brand words are classified according to the similarity between the search brand words, when the similarity between the search brand words is greater than a certain threshold, the search brand words are classified into one category to form structures of different categories, and a relevance map of brands of respective categories is exhibited. FIGS. 5a-5b exhibit a market structure of underwear in a clothing brand, FIGS. 6a-6b exhibit a market structure of milk powder in a maternal and child brand, and a brand with a high similarity can be recommended to the users according to the relevance map of brands of respective categories to optimize the brand positioning strategy.

The similarity mining method provided by the invention calculates similarities of the brand words using a clustering algorithm (e.g., word2vector) according to the user search word data and the user post-purchase comment data, which can automatically calculate a similarity between brands, reduce a personnel cost, increase a brand recall rate, and improve a recommended brand conversion rate.

Figure 4:
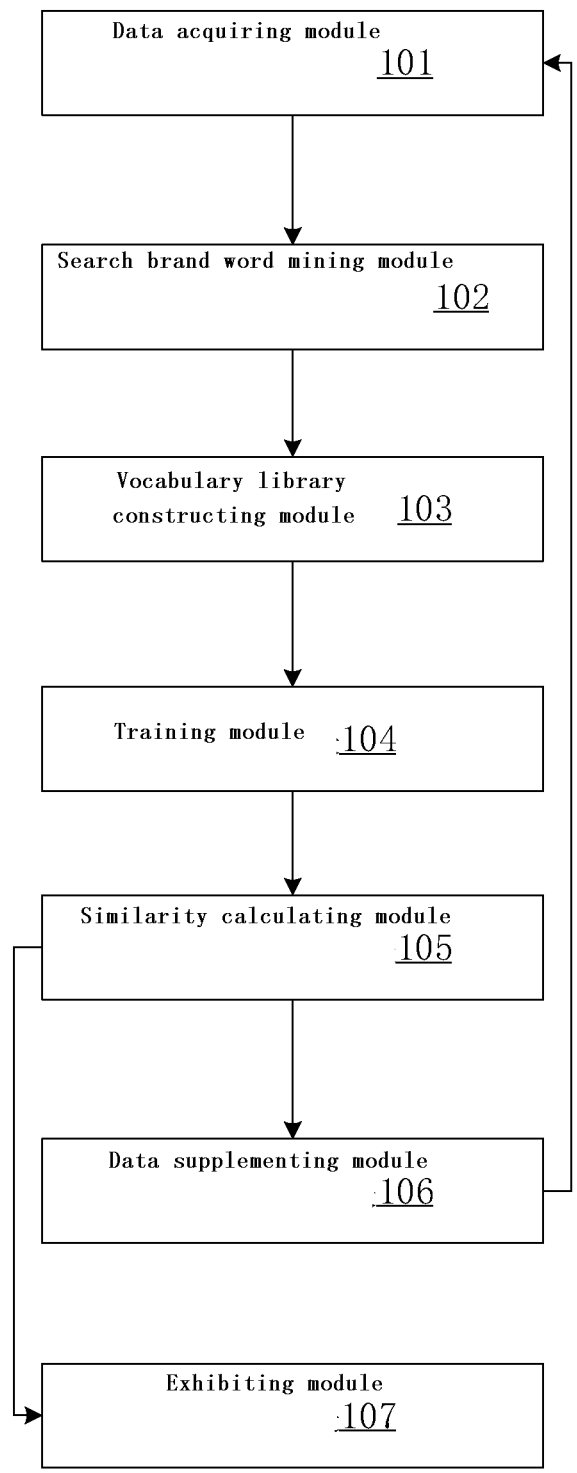
FIG. 4 shows a structure schematic diagram of a similarity mining device according to an embodiment of the invention.

FIG. 4 shows a structure schematic diagram of a similarity mining device according to an embodiment of the invention.

As shown in FIG. 4, the similarity mining device comprises a data acquiring module 101, a search brand word mining module 102, a vocabulary library constructing module 103, a training module 104 and a similarity calculating module 105.

The data acquiring module 101 is used for acquiring user behavior data and brand word data, wherein the user behavior data includes user search word data and user comment data.

In the embodiment, the data acquiring module 101 acquires user post-shopping comment text data, user search word data, and brand word data from a data warehouse through a hive query statement. After observing a large amount of data and understanding the data, filtering rules are formulated to filter out invalid garbage data. The user post-shopping comment text data is subjected to segmentation and part-of-speech tagging, and a proprietary word bank is established to enhance the effect of the segmentation and part-of-speech tagging.

The search brand word mining module 102 is used for acquiring search brand words according to the user search word data and pre-stored brand word data.

In the embodiment, the search brand word mining module 102 filters the user search word data to filter out search words not related to the brand to obtain search words related to the brand. The brand words are extracted from the search words related to the brand according to the brand word data to obtain the search brand words.

Specifically, the search brand word mining module 102 filters the user behavior data to obtain user search word data, wherein the user search word data includes brand words, by taking one piece of the user search word data as an example, the user search word data is: BOSIDENG, down jacket, light and thin, and the brand word, i.e., the search brand word, is acquired from the user search word data according to the brand word data. We can get the search brand word as follows: BOSIDENG.

The vocabulary library constructing module 103 is used for constructing a corpus important vocabulary library relating to the search brand words according to the user behavior data.

In the embodiment, the vocabulary library constructing module 103 constructs the corpus important vocabulary library by subjecting the user behavior data to filtration, merging, segmentation, and word deactivation.

The training module 104 is used for using the corpus important vocabulary library as an input of a word vector tool to perform word vector model training to acquire word vectors of the search brand words.

In the embodiment, the training module 104 is achieved by means of a word2vec tool. The trained corpus important vocabulary library includes the user comment data of the search brand words, and each piece of data includes the search brand words and characters describing the search brand words. In order to reduce an impact of data on training word vectors, the data is firstly subjected to filtering and merging operations, and valid data is obtained after a data cleaning treatment. In addition, by considering a training speed and a complexity of achieving recommendation, a HS-CBOW model that is trained comparatively fast and is relatively easily achieved in terms of engineering is selected to be used to establish the word vectors of the corpus important vocabulary library. word2vec is used as the word vector tool, and an HS-CBOW model is used to establish the word vectors of the corpus important vocabulary library. The word vector dimension is set to a 100-dimensional one, and the text window is set to 5.

Further, in terms of the selection of a word vector dimension, generally speaking, the higher the dimension is and the larger the text window is, the better the feature representation effect of the word vectors is, but the longer the time consumption of the word vector training is, and the larger the space occupied by training results is. When a comparatively large data set is faced, a comparatively fast calculation efficiency can be maintained by setting the dimension to a 100-dimensional one, and selecting the text window as 5, and word vectors of a certain amount of vocabulary are finally obtained by training.

The similarity calculation module 105 is used for calculating a similarity between the search brand words according to the word vectors of the search brand words.

In the embodiment, a distance between brands a and b is calculated by a quantity product of the word vectors, and then the similarity between a and b is calculated according to the formula sim(a,b)=cosine(word2vec(a), word2vec(b)). The larger the distance between a and b is, the higher the similarity between a and b is.

In a preferred embodiment, the similarity mining device further comprises a data supplementing module 106 for supplementing the user comment data under the search brand word when the similarities between the search brand word and other search brand words are all less than a preset threshold.

Due to the complexity and large volume of user comments, we cannot use all the comment data to perform training at one time, and not all the comments contribute to the calculation of the word vectors by the search brand words we need. Insufficiency of contributing data is likely to result in one of our search brand words not finding its relevant brand. Here, we judge whether the search brand word finds the relevant brand according to the calculated similarity, i.e., when the similarities between one of the search brand words and other search brand words are all less than the preset threshold, it indicates that the search brand word does not find the relevant brand, the user comment data under the search brand word is extracted according to the search brand word not finding the similarity, and the word vector of the search brand word is calculated again from step S01. The process is iterated multiple times until the number of iterations is greater than the set number of thresholds, thereby greatly increasing the recall rate of the brand similarity distance.

In a preferred embodiment, the similarity mining device further comprises an exhibiting module 107 for classifying the search brand words according to the similarity between the search brand words, and exhibiting a relevance map of brands of respective categories according to the classification result.

In the embodiment, the search brand words are classified according to the similarity between the search brand words, when the similarity between the search brand words is greater than a certain threshold, the search brand words are classified into one category to form structures of different categories, and a relevance map of brands of respective categories is exhibited. FIGS. 5a-5b exhibit a market structure of underwear in a clothing brand, FIGS. 6a-6b exhibit a market structure of milk powder in a maternal and child brand, and a brand with a high similarity can be recommended to the users according to the relevance map of brands of respective categories to optimize the brand positioning strategy.

The similarity mining device provided by the invention calculates similarities of the brand words using a clustering algorithm (e.g., word2vector) according to the user search word data and the user post-purchase comment data, which can automatically calculate a similarity between brands, reduce a personnel cost, increase a brand recall rate, and improve a recommended brand conversion rate.

The embodiments in accordance with the invention, as described above, do not state in detail all the details, and the invention is not limited to the specific embodiments. Obviously, many modifications and variations can be made in accordance with the descriptions above. The Description selects and describes in detail these embodiments in order to better explain the principle and actual application of the invention, so that those skilled in the art can use the invention and make modified uses on the basis of the invention very well. The scope of protection of the invention should be determined by the scope defined by the claims of the invention.

DRAWINGS

Figure 1:
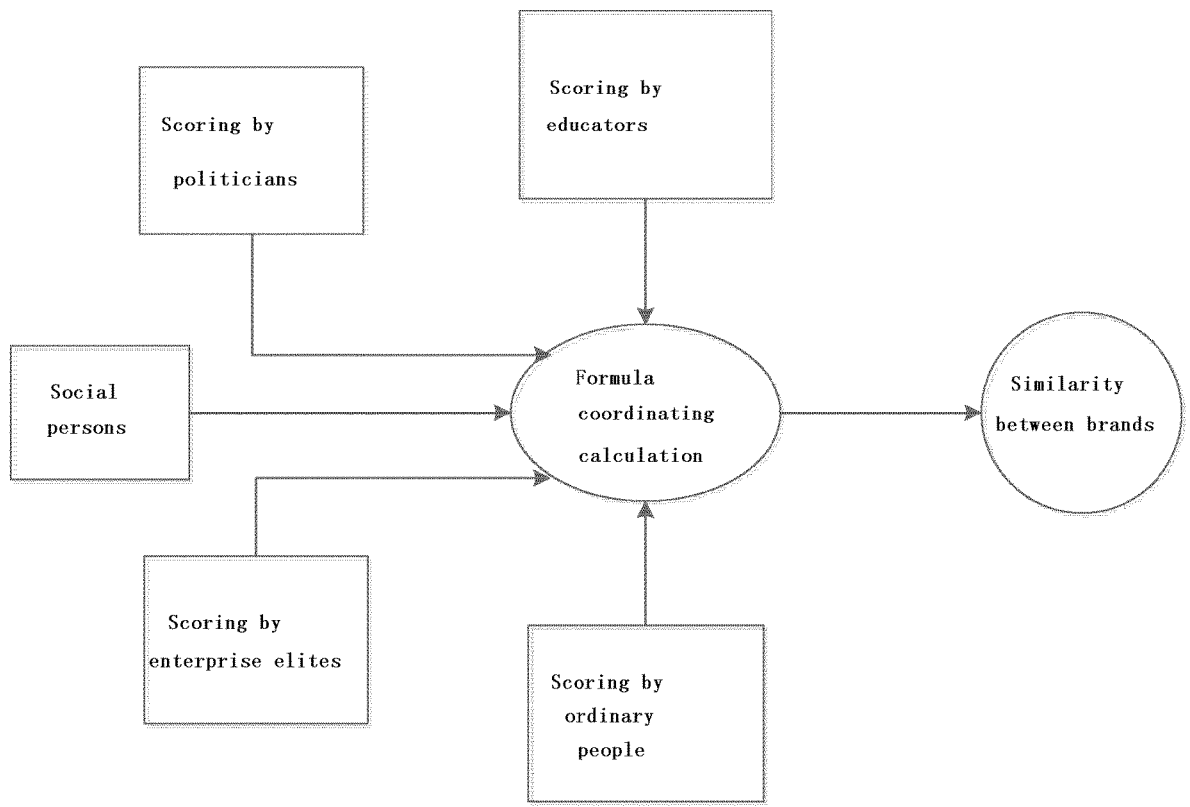
FIG. 1 shows a flow chart of a method for manual evaluation of scores from all parties in the prior art.
Figure 2:
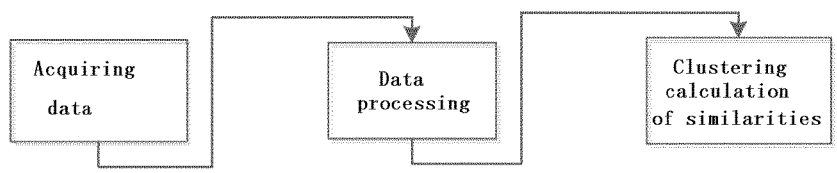
FIG. 2 shows a flow chart of a public opinion hot topic clustering method in the prior art.

FIG. 1
Scoring by educators
Scoring by politicians
Social persons
Scoring by enterprise elites
Scoring by ordinary people
Formula coordinating calculation
Similarity between brands FIG. 2
Acquiring data
Data processing
Clustering calculation of similarities FIG. 3
S01 Acquiring user behavior data, wherein the user behavior data includes user search word data and user comment data
S02 Acquiring search brand words according to the user search word data and pre-stored brand word data
S03 Constructing a corpus important vocabulary library relating to the search brand words according to the user behavior data
S04 Using the corpus important vocabulary library as an input of a word vector tool to perform word vector model training to acquire word vectors of the search brand words
S05 Calculating a similarity between the search brand words according to the word vectors of the search brand words
S06 Supplementing the user comment data under the search brand word when the similarities between the search brand word and other search brand words are all less than a preset threshold
S07 Classifying the search brand words according to the similarity between the search brand words, and exhibiting a relevance map of brands of respective categories according to the classification result FIG. 4
101 Data acquiring module
102 Search brand word mining module
103 Vocabulary library constructing module
104 Training module
105 Similarity calculating module
106 Data supplementing module
107 Exhibiting module FIG. 5a
SEPTWOLVES
TONLION
Mark Fairwhale
Pierre Cardin
Qianzhihe
LEABORNES
Bossini
YISHION
YAYA
Beijirong
BOSIDENG

FIG. 5b

| Relevant word ranking | Relevant word brand | Relevance |
|---|---|---|
| 1 | Beijirong | 72.25% |
| 2 | TONLION | 72.21% |
| 3 | LEABORNES | 71.98% |
| 4 | Pierre Cardin | 71.97% |
| 5 | YISHION | 70.81% |
| 6 | Qianzhihe | 70.7% |
| 7 | SEPTWOLVES | 70.4% |
| 8 | Mark Fairwhale | 70.36% |
| 9 | YAYA | 69.99% |
| 10 | Bossini | 69.9% |

Figure 6A:
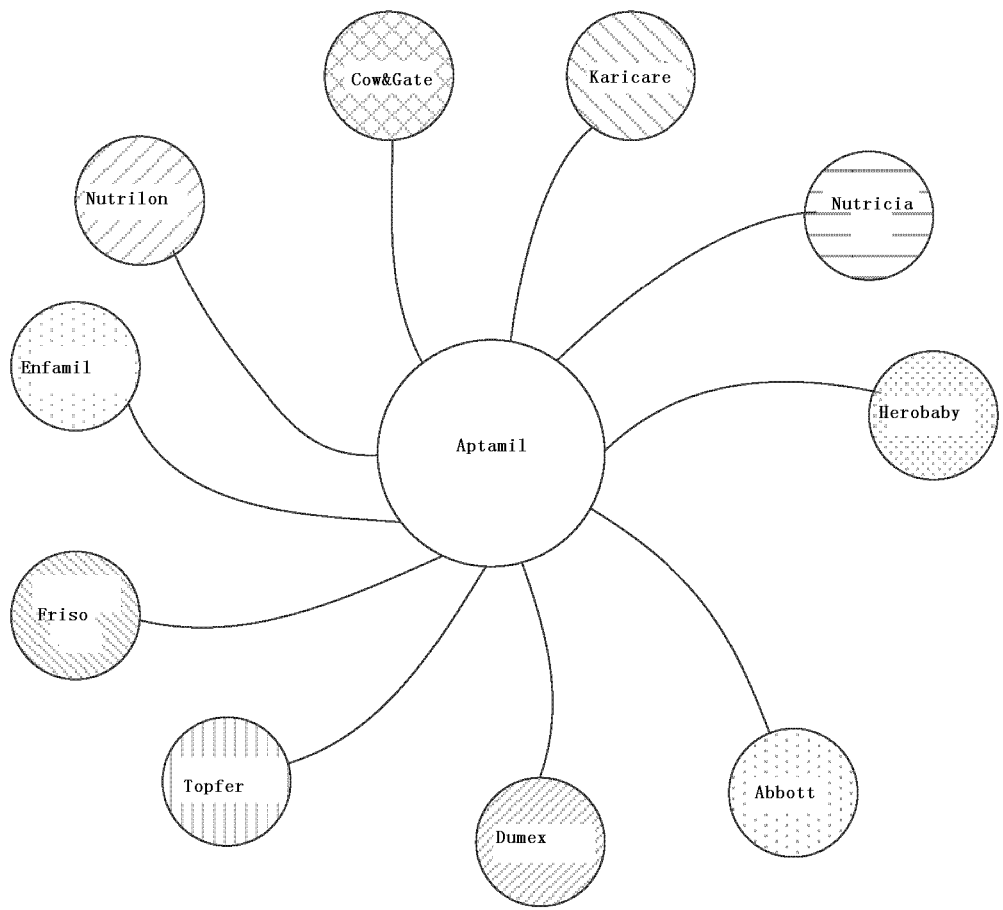
FIG. 6 shows a schematic diagram of a market structure of milk powder in a maternal and child brand according to an embodiment of the invention.

FIG. 6a
Nutrilon
Cow&Gate
Karicare
Nutricia
Herobaby
Abbott
Dumex
Topfer
Friso
Enfamil
Aptamil

FIG. 6b

| Relevant word ranking | Relevant word brand | Relevance |
|---|---|---|
| 1 | Cow&Gate | 74.18% |
| 2 | Nutrilon | 72.91% |
| 3 | Karicare | 72.7% |
| 4 | Dumex | 70.27% |
| 5 | Enfamil | 70.1% |
| 6 | Abbott | 69.56% |
| 7 | Nutricia | 69.37% |
| 8 | Herobaby | 68.1% |
| 9 | Topfer | 67.89% |
| 10 | Friso | 67.2% |

The invention claimed is:

1. A similarity mining method, comprising:
acquiring user behavior data and brand word data, wherein the user behavior data includes user search word data and user comment data;
acquiring search brand words according to the user search word data and pre-stored brand word data;
constructing a corpus important vocabulary library relating to the search brand words according to the user behavior data;
using the corpus important vocabulary library as an input of a word vector tool to perform word vector model training to acquire word vectors of the search brand words;
calculating a similarity between the search brand words according to the word vectors of the search brand words; and
classifying the search brand words according to the similarity between the search brand words, and exhibiting a relevance map of brands of respective categories according to the classification result,
wherein in constructing a corpus important vocabulary library relating to the search brand words according to the user behavior data, the corpus important vocabulary library is constructed by subjecting the user behavior data to filtration, merging, segmentation, and word deactivation.

2. The method of claim 1, wherein the method further comprises:
supplementing the user comment data under the search brand word when the similarities between the search brand word and other search brand words are all less than a preset threshold.

3. The method of claim 1, wherein in using the corpus important vocabulary library as an input of a word vector tool to perform word vector model training to acquire word vectors of the search brand words, word2vec is used as the word vector tool, and an HS-CBOW model is used to establish the word vectors of the corpus important vocabulary library.

4. A similarity mining device, comprising:
a processor, the processor being configured to:
acquire user behavior data and brand word data, wherein the user behavior data includes user search word data and user comment data;
acquire search brand words according to the user search word data and pre-stored brand word data;
construct a corpus important vocabulary library relating to the search brand words according to the user behavior data;
use the corpus important vocabulary library as an input of a word vector tool to perform word vector model training to acquire word vectors of the search brand words;
calculate a similarity between the search brand words according to the word vectors of the search brand words; and
classify the search brand words according to the similarity between the search brand words, and exhibit a relevance map of brands of respective categories according to the classification result.

5. The device of claim 4, wherein the processor further being configured to:
supplement the user comment data under the search brand word when the similarities between the search brand word and other search brand words are all less than a preset threshold.

6. A non-transitory computer-readable storage medium storing processor-executable instructions for similarity mining, wherein when the processor-executable instructions are executed by a processing device cause the processing device to:
acquire user behavior data and brand word data, wherein the user behavior data includes user search word data and user comment data;
acquire search brand words according to the user search word data and pre-stored brand word data;
construct a corpus important vocabulary library relating to the search brand words according to the user behavior data;
use the corpus important vocabulary library as an input of a word vector tool to perform word vector model training to acquire word vectors of the search brand words; and
calculate a similarity between the search brand words according to the word vectors of the search brand words.

* * * * *